Dec. 25, 1956  H. C. BEHRENS  2,775,113
COMBINATION LOCKS
Filed May 8, 1951  6 Sheets-Sheet 1

INVENTOR.
Herbert C. Behrens
BY
Frease, Bishop & Hamilton
ATTORNEYS

Dec. 25, 1956   H. C. BEHRENS   2,775,113
COMBINATION LOCKS
Filed May 8, 1951   6 Sheets-Sheet 2

INVENTOR.
Herbert C. Behrens
BY
Frease, Bishop & Hamilton
ATTORNEYS

Dec. 25, 1956  H. C. BEHRENS  2,775,113
COMBINATION LOCKS
Filed May 8, 1951  6 Sheets-Sheet 3

INVENTOR.
Herbert C. Behrens
BY
Frease, Bishop & Hamilton
ATTORNEYS

Dec. 25, 1956  H. C. BEHRENS  2,775,113
COMBINATION LOCKS
Filed May 8, 1951  6 Sheets-Sheet 4
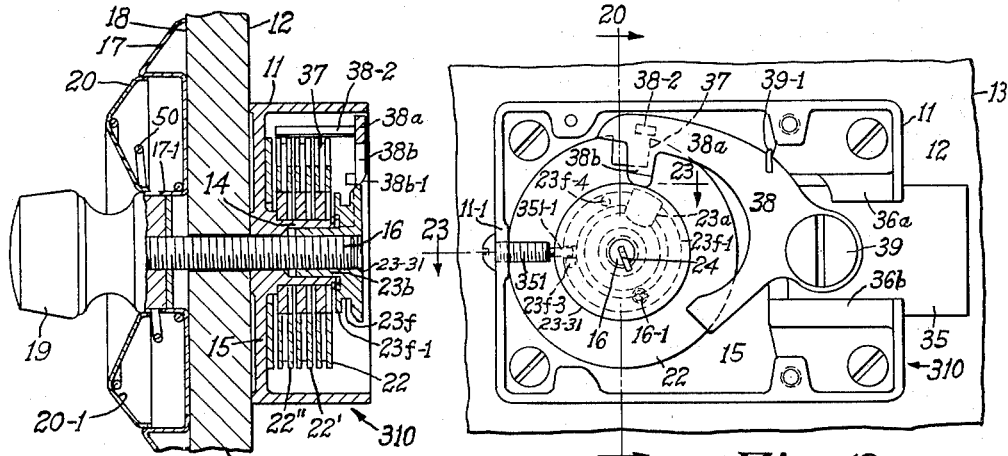
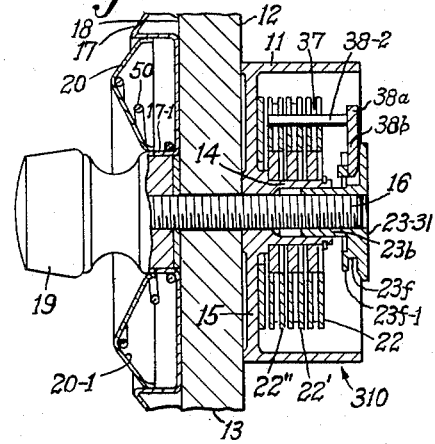
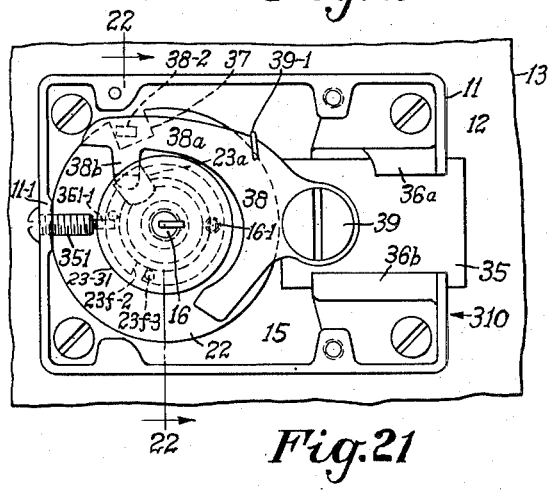
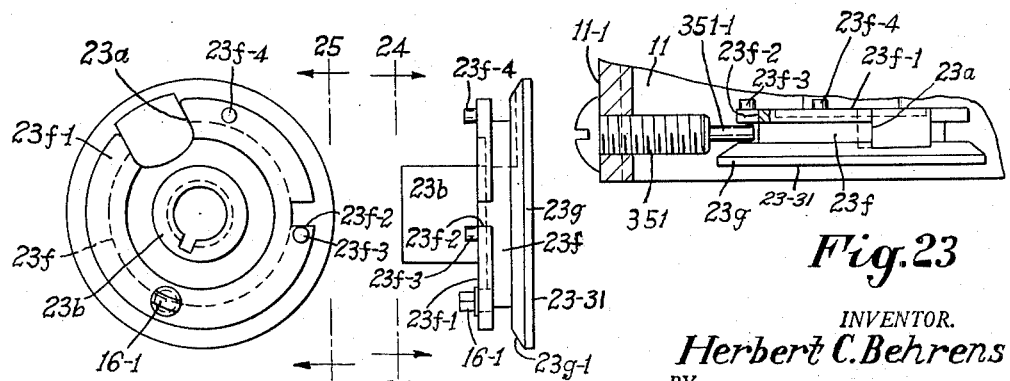
INVENTOR.
Herbert C. Behrens
BY
Frease, Bishop & Hamilton
ATTORNEYS Dec. 25, 1956     H. C. BEHRENS     2,775,113
COMBINATION LOCKS
Filed May 8, 1951     6 Sheets-Sheet 5
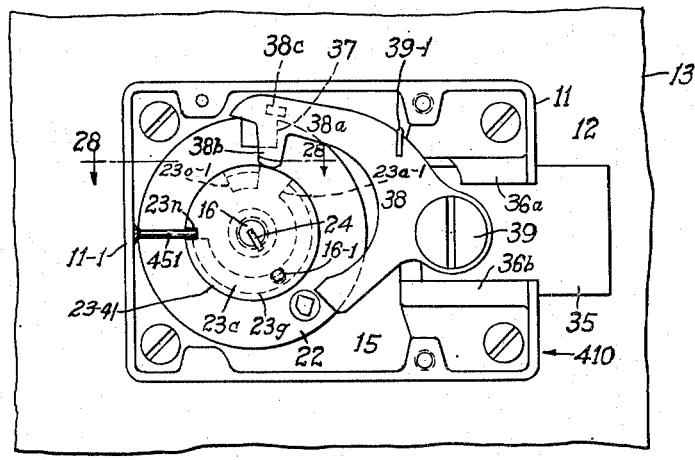
*Fig. 26*
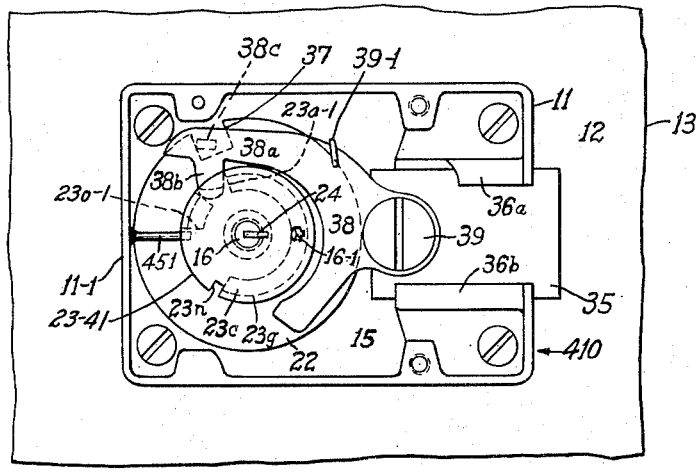
*Fig. 27*
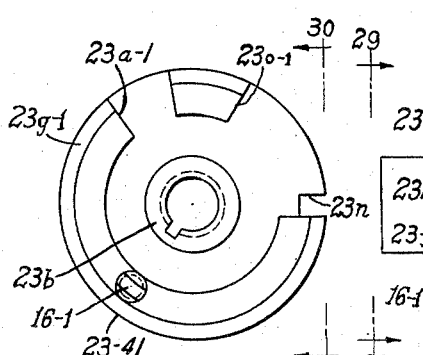
*Fig. 29*     *Fig. 30*
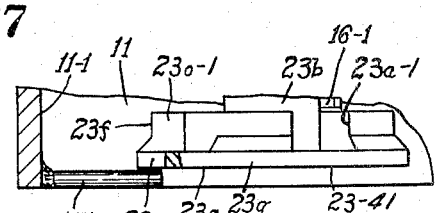
*Fig. 28*
INVENTOR.
Herbert C. Behrens
BY Frease, Bishop & Hamilton
ATTORNEYS Dec. 25, 1956  H. C. BEHRENS  2,775,113
COMBINATION LOCKS Filed May 8, 1951  6 Sheets-Sheet 6

INVENTOR.
Herbert C. Behrens
BY
Frease, Bishop & Hamilton
ATTORNEYS

United States Patent Office 2,775,113
Patented Dec. 25, 1956

2,775,113

COMBINATION LOCKS

Herbert C. Behrens, Canton, Ohio, assignor to Diebold, Incorporated, Canton, Ohio, a corporation of Ohio Application May 8, 1951, Serial No. 225,167

23 Claims. (Cl. 70—133)

My invention or discovery relates to combination locks generally, and more particularly to combination locks such as set forth in my U. S. Letters Patents No. 2,656,705, dated October 27, 1953, and No. 2,658,374, dated November 10, 1953, which are improvements in the combination lock set forth in U. S. Letters Patent No. 1,956,-304, issued to Albert L. Abbott and Charles H. Miller on April 24, 1934.

The combination lock set forth in said Abbott and Miller U. S. Letters Patent No. 1,956,304 includes a case on the rear of the door equipped with the lock, one or more coaxial cylindrical tumblers having equal diameters and being rotatably mounted in the case, a spindle extending from the outside of the door through the door and into the case and the spindle having a dial with a knob mounted on its outer end rotatable within a dial ring on the outer face of the door and the spindle having on its inner end beyond the tumblers a cylindrical cam with an operating notch. Usual pin, lever and circular segment means coact between the cam and the innermost tumbler, and between each tumbler and the next outer tumbler, whereby by manipulation of the dial and setting the combination, the notches of the tumblers are aligned with each other and with the operating notch of the cam for unlocking the lock.

The lock furthermore includes a reciprocable bolt pivotally connected with one end of an operating lever including an upper arm having a cam follower tongue depending from its outer end, and a stop arm or fence extending from the inner side of the upper arm parallel with the axis of the tumblers. The operating lever is spring pressed towards the tumblers, and when the tumbler notches are aligned with each other and the operating notch of the cam which is located in the aligned position below the cam follower tongue of the upper arm, the fence is permitted to drop into the tumbler notches and the cam follower tongue is permitted to drop into the operating notch of the cam, whereby the bolt may be withdrawn from its extended locking position, and whereby the bolt may be also extended to locking position when the door is again closed and locked by suitable rotations of the dial and spindle. After the bolt is extended into locking position, the spindle is then spun in either direction to scramble the combination by turning the tumblers so that their notches are out of alignment with each other.

An unauthorized person seeking to manipulate a combination lock in order to detect the combination must know the internal construction of the lock. In a combination lock as set forth in said Abbott and Miller U. S. Letters Patent No. 1,956,304, the tumblers and the cam have characteristics which enable the combination to be detected.

With respect to the tumblers, when the bolt is extended and the combination scrambled, the fence rests upon the cylindrical peripheries of the tumblers. If such a lock is made in a laboratory to extreme accuracy, and assembled with extreme precision, the lock cannot be manipulated by an unauthorized person so as to detect the combination and effect unlocking. In the usual mass production of the parts of such a lock and the assembly of the same, the extreme accuracy necessary for preventing manipulation cannot be attained. Unless the bottom surface of the fence is exactly parallel with the axis of rotation of the tumblers, and unless the diameters of the tumbler discs are all exactly the same, when the fence rides over the opening formed by one of the tumbler notches, even though its bottom surface is riding on the peripheries of the remaining tumbler discs, very minute movements of the fence as it rides over the corners of such a notch can be felt in rotating the dial by the fingers of an unauthorized person who knows the internal construction of the lock.

With respect to the cam, the internal construction of the lock which enables the unauthorized person to feel the movement of the fence as aforesaid arises from the fact that the operating notch of the cylindrical cam must have rounded upper corners to prevent binding or catching during movements of the operating lever. One side of the notch pulls the tongue to retract the bolt, and the other side of the notch pushes the tongue to extend the bolt and then elevate it. If the notch upper corners are not rounded or tapered, there would be a binding or catching of the tongue in the notch during these actions.

In a perfect lock, in which the cylindrical surfaces of the tumblers are aligned with each other axially and have exactly the same diameters, and in which the cylindrical surface of the cam is exactly coaxial with the cylindrical surfaces of the tumblers, and in which the fence is exactly parallel with the axis of the tumblers and the cam, the fence rides on the cylindrical surfaces of all the tumblers and the lower rounded end of the tongue rides on the cylindrical surface of the cam. There is no feel transmitted to the knob at any time during manipulation of the lock.

In actual practice, however, either the fence may be slightly angled with respect to the axis of the tumblers, or one or more of the tumblers may be slightly larger in diameter than the others or may be eccentric with respect to the others. In any event, the fence in such a lock rides only on one tumbler until it enters the notch of that tumbler.

Moreover, in the usual commercial lock the tongue usually rides on the cylindrical surface of the cam, and when it passes over a corner of the cam notch, the tongue makes a first drop into the notch which in itself gives a feel on the knob indicated at one point in the dial. If at a time when the tongue is passing over a corner of the cam notch, an inaccurate tumbler notch is being passed over by the fence, the tongue is permitted to make a second drop different than the first drop and which transmits a feel to the knob indicated at a second point on the dial, and is thus a reference point for the location of the dial setting of the particularly inaccurate tumbler.

By repeating this procedure for each tumbler in succession after the reference point has been detected for the first tumbler, the skillful manipulator is able to detect the entire combination for which the lock is set.

The combination locks disclosed in my Patents Nos. 2,656,705 and 2,658,374 include, in combination with a modification of parts of the combination lock set forth in said Abbott and Miller U. S. Letters Patent No. 1,956,304, a spindle arranged for movement in the direction of its longitudinal axis and which is normally spring pressed in the direction of the dial knob, and the cam on the inner end of the spindle having an operating notch in a portion immediately adjacent the tumblers and having a completely cylindrical portion beyond the notched portion.

The objects of the present invention or discovery, from a broad standpoint, include the provision of an improved combination lock generally of the type set forth in my said Patents Nos. 2,656,705 and 2,658,374, and in which the spindle is arranged for movement in the direction of its longitudinal axis and which is normally spring pressed in the direction of the dial ring, and in which a stationary protruding member extends from a stationary part of the lock, and in which a part attached to the spindle has formed therein a groove which is adapted to be aligned with the protruding member for permitting the axial movement of the spindle so as to displace the cylindrical portion of the cam from beneath the cam follower tongue to a position permitting the cam follower tongue to drop into the operating notch. Moreover, the cam follower tongue is made short so as not to touch the portion of the cam formed with the operating notch when the spindle is pushed in and the fence rests on the tumblers.

Further objects of the present invention or discovery include the provision of such an improved combination lock in which the improvements may be effected by the addition of or modification of a limited number of parts of the combination lock set forth in said Abbott and Miller U. S. Letters Patent No. 1,956,304, and which is thus adapted for economical manufacture without the necessity of manufacturing an entirely new set of parts for the improved lock.

The foregoing and other objects are attained by the combination locks, constructions, improvements, parts, combinations, and sub-combinations which comprise the present invention or discovery, the nature of which is set forth in the following general statement, and preferred embodiments of which together with their mode of use are set forth by way of example in the following description, and which are particularly and distinctly pointed out and set forth in the appended claims forming part hereof.

The nature of the improved combination lock of the present invention or discovery may be stated in general terms as including, in combination with other usual parts of a combination lock such as set forth in said Abbott and Miller U. S. Letters Patent No. 1,956,304, the axially movable spindle set forth in my said Patents Nos. 2,656,705 and 2,658,374, and a part attached to the spindle has formed therein a groove, and in which a stationary part of the lock mounts a protruding member adapted to be aligned with the groove at the final setting of the combination for permitting the axial movement of the spindle and displacement of the cylindrical portion of the cam from beneath the cam follower tongue to a position permitting the cam follower tongue to drop into the operating notch.

The length of the cam follower tongue from the lower face of the fence is less than the radial distance from the lower face of the fence to the reduced diameter surface of the cam head in which the operating notch is formed, whereby if the spindle is pushed in while the combination is scrambled, the fence rests on the tumbler and there is clearance between the lower end of the cam follower tongue and the reduced diameter surface of the cam head.

By way of example, preferred embodiments of the combination lock of the present improvements and parts thereof are illustrated in the accompanying drawings forming part hereof, in which:

Figure 1 is a fragmentary rear elevational view of a first and preferred embodiment of the improved combination lock hereof looking toward the rear face of the door on which the lock is mounted and with the cover plate of the lock removed and showing the parts of the lock in their relative positions when the bolt is in its fully extended locking position, and with the tumbler wheels having their notches aligned after setting of the combination and the cam follower tongue of the operating lever seated on the cylindrical portion of the spindle cam and with the operating notch of the spindle cam ready to receive the cam follower tongue, and with the stationary protruding member extending from the housing tube into a groove on the cam hub;

Fig. 19 is a view similar to Fig. 1 and showing a fourth embodiment of the improved combination lock hereof;

Fig. 20 is a transverse sectional view thereof as on line 20—20, Fig. 19;

Fig. 21 is a view similar to Fig. 19 showing the combination set, the cam follower tongue in the operating notch in the cam, and the bolt withdrawn to the unlocked position;

Fig. 22 is a transverse sectional view thereof as on line 22—22, Fig. 21;

Fig. 23 is an enlarged fragmentary sectional view as on line 23—23, Fig. 19;

Fig. 24 is a detached front end view of the cam of the fourth embodiment of the lock looking in the direction of the arrows 24—24, Fig. 25;

Fig. 25 is a side elevational view thereof looking in the direction of the arrows 25—25, Fig. 24;

Fig. 26 is a view similar to Fig. 1 showing a fifth embodiment of the improved combination lock hereof;

Fig. 27 is a similar view showing the parts of the lock in their relative positions when the bolt is withdrawn to the unlocked position;

Fig. 28 is an enlarged fragmentary sectional view thereof as on line 28—28, Fig. 26;

Fig. 29 is a detached front end view of the cam of the fifth embodiment of the lock looking in the direction of the arrows 29—29, Fig. 30;

Fig. 30 is a side elevational view thereof looking in the direction of the arrows 30—30, Fig. 29;

Similar numerals refer to similar parts throughout the drawings.

Figure 2:
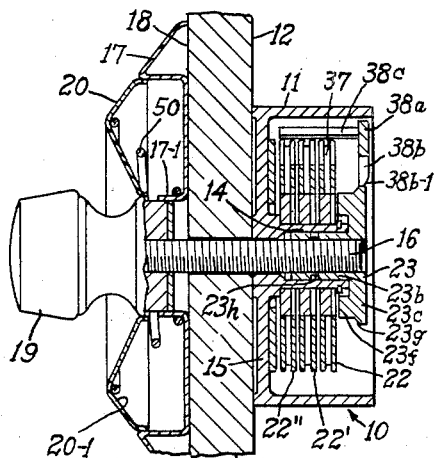
Fig. 2 is a transverse sectional view thereof as on line 2—2, Fig. 1.

A first and preferred embodiment of the improved combination lock is illustrated in Figs. 1 to 7, inclusive, and is indicated generally at 10, and includes a case 11 which is mounted on the inner face 12 of a door 13, which may be the door of a safe, and the lock may be used for stopping boltwork, not shown, in a usual manner. The lock 10 includes certain parts not shown in detail and which are substantially identical with such parts as shown and described in said Abbott and Miller U. S. Letters Patent No. 1,956,304, whereas other parts of the lock construction of said Abbott and Miller U. S. Letters Patent No. 1,956,304 pertinent to the present improvements, are shown and described in detail herein, as well as modified parts of the lock construction of said Abbott and Miller U. S. Letters Patent No. 1,956,304, and parts added thereto for the attainment of the present improvements.

The case 11 includes a tube 14 extending from the base wall 15 of the case, and the base wall is abutted against the inner face 12 of the door 13.

The bore of the tube 14 communicates with a registering aperture formed in the base or front wall 15 of the case, and with an aperture formed in the door 13, and an operating spindle 16 is journalled in the tube 14 and extends through the apertures of the base wall 15 and door 13. The operating spindle 16 is also slidable in the tube 14 in the direction of its longitudinal axis.

A dial ring 17 is secured upon the front face 18 of the door 13, and the spindle 16 also extends through an aperture formed in the dial ring, and a knob 19 and dial 20 are secured upon the outer end of the operating spindle 16.

The dial may have inscribed thereon 100 equally spaced division lines, each tenth division line of which is numbered successively from 10 to 100.

A single preferably vertically extending mark or arrow 21 is formed or inscribed on the dial ring above the knob, and the mark 21 is utilized in conjunction with rotation of the dial 20 both for operating the combination, and for changing the combination, by reason of the improvements of the several mechanisms of the lock set forth in detail in said Abbott and Miller U. S. Letters Patent No. 1,956,304.

Within the case 11 of the lock 10, tumbler wheels 22, and 22', and 22" are journalled on the tube 14 between the base wall 15 and a spindle cam 23, the cam being removably secured upon the extremity of the spindle 16 within the case, as by means of cooperating screw threads on the cam and spindle and a key 24 interposed in keyways formed in the cam and spindle.

The wheel 22 adjacent the spindle cam 23 is driven by a usual pin 16-1 mounted on the spindle cam, prefer-ably on the inner face of the spindle cam 23 which is secured as aforesaid on the spindle. The drive from the pin 16-1 on the cam to the adjacent wheel 22 is by usual means such as a lever 26 journalled on the tube 14 and having one side abutted by the cam drive pin 16-1 and the other side abutting one end of a segmental flange or lug 29 on the hub or center 28 of the wheel 22. Similar drive means such as a pin 30 carry the drive from the wheel 22 to the wheel 22' and from the wheel 22' to the wheel 22". Such drive means are set forth in detail in said Abbott and Miller U. S. Letters Patent No. 1,956,304.

Each of the wheels 22, 22', and 22" are preferably of the construction set forth in detail in said Abbott and Miller U. S. Letters Patent No. 1,956,304, and each wheel may be described generally as including a spaced pair of outer ring disc members releasable and engageable with the hub or center 28, and the means for effecting the drive from the spindle cam 23 to the wheel 22, and from the wheel 22 to the wheel 22', and from the wheel 22' to the wheel 22" include the segmental lug or flange 29 on one side of the hub or center, and the pin 30 on the other side of the hub or center of each wheel.

Figure 1:
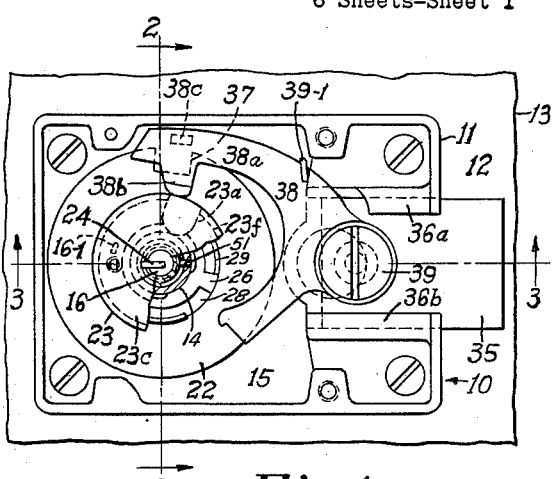
Figure 6:
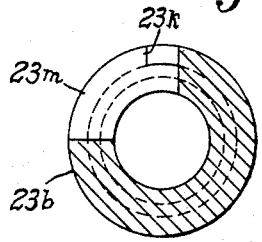
Fig. 6 is a transverse sectional view thereof as on line 6—6, Fig. 5.
Figure 3:
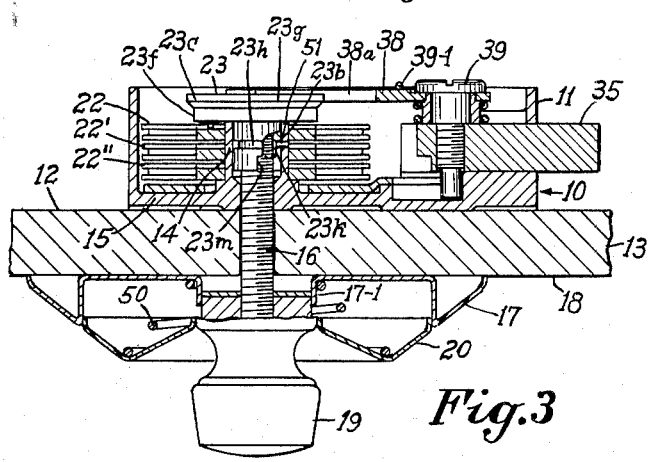
Fig. 3 is a transverse sectional view thereof as on line 3—3, Fig. 1.
Figure 5:
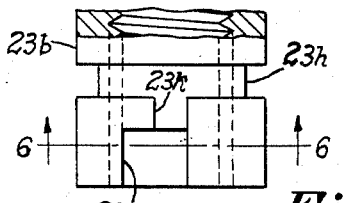
Fig. 5 is an enlarged fragmentary detached view similar to Fig. 3 showing the cam hub.
Figure 7:
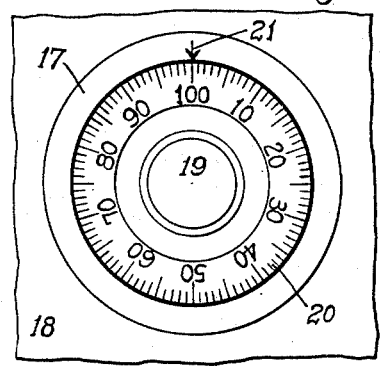
Fig. 7 is a fragmentary front elevational view looking towards the front face of the door and illustrating the dial and knob and the dial ring of the lock.
Figure 4:
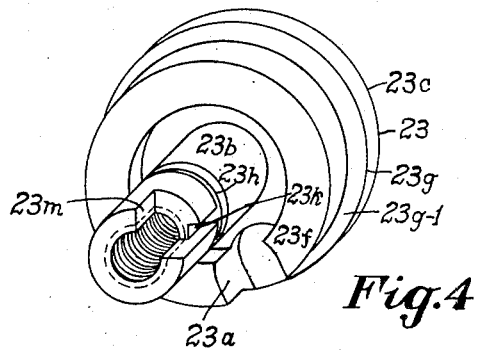
Fig. 4 is a detached oblique perspective view of the cam of the first embodiment of the lock showing its front or hub end positioned to best show the longitudinal and circumferential grooves in the cam hub.
Figure 9:
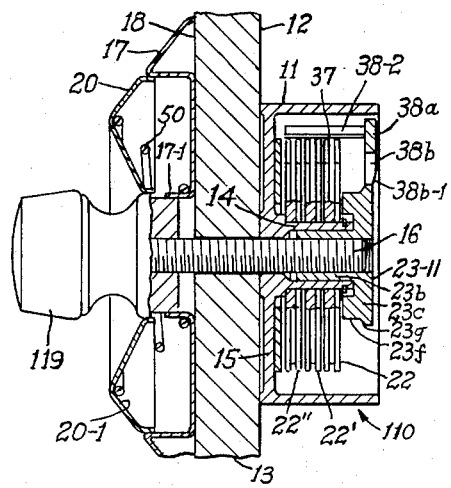
Fig. 9 is a transverse sectional view thereof as on line 9—9, Fig. 8.

The lock 10 furthermore includes a bolt 35 mounted in suitable ways 36a and 36b formed in the case 11, for movement to and from the extended locking or bolting position, illustrated in Figs. 1 and 3.

Movement of the bolt 35 to and from locking or bolting position may only be made after the tumbler wheels have been rotated to certain positions relative to each other as determined by the particular combination for which the lock is set. That is to say the combination is determined by the relative location of each wheel center with respect to its outer discs, and the discs of each wheel have outwardly opening registering notches 37 formed therein which must be aligned with the notches of all the other wheel discs when the combination is set.

The bolt moving means include an operating lever 38 which is pivotally mounted on the bolt 35 as by means of a pivot screw 39. The lever 38 includes an operating arm 38a extending upwardly from the pivot screw 39 and above the cam 23.

The operating arm 38a has formed thereon a cam follower tongue 38b which extends from the arm 38a towards the axis of the spindle shaft and in line with the cam 23, and the cam 23 has a lever operating notch 23a formed therein which cooperates with the follower tongue 38b for moving the operating lever and bolt when the tongue is permitted to be inserted into the cam notch 23a. A spring 39-1 normally presses the lever arm 38a towards the cam 23.

The cam 23 includes a hub 23b and an enlarged cylindrical head 23c, the hub having an internally threaded bore and a keyway formed therein for connection with the spindle 16 as above described. The head 23c has a substantial thickness and the cam notch 23a is formed in one end 23f of the head, which is adjacent the tumblers and is the front end of the head 23c with reference to the door 13 on which the lock is mounted. The other or rear end 23g of the head 23c is cylindrical around its entire periphery.

The hub 23b of the cam 23 rotatably and slidably fits in a counterbore formed in the rear end of the bore of the tube 14. The central aperture of the ring 17 is surrounded by a forwardly extending neck 17-1 and a conical and helical compression spring 50 has a smaller end engirdling the dial ring neck 17-1 and larger end seated against an inner depression 20-1 formed in the dial 20, which as aforesaid is secured with the knob 19 on the outer end of the operating spindle 16. The smaller end of the spring 50 reacts against the front face of the dial ring 17 and the larger end of the compression spring 50 reacts against the rear face of the dial 20. The spindle 16 is thus spring pressed forwardly so that the cam 23 is normally urged against the rear end of the tube 14 as shown in Figs. 2 and 3. Pushing the knob 19 rearwardly or inwardly towards the door 13 displaces the cam 23 rearwardly to a position in which the front end 23f in which the operating notch 23a is formed of the cam head 23c is located beneath the lower end of the cam follower tongue 38b.

A fence or stop arm 38c extends from the inside face of the lever arm 38a above the tongue 38b and across the top of the tumbler wheels. For the purposes of the present invention or discovery, the distance from the underface of the fence 38c to the lower end of the tongue 38b is less than the distance from the underface of the fence 38c to the periphery of the cam front end 23f when the fence 38c rests on the tumbler wheels. The periphery of the front end 23f has a smaller diameter than the periphery of the rear end 23g of the cam head 23c. Accordingly, when the fence 38c rests on the tumbler wheels after the spindle 16 has been pushed inwardly and before the combination has been set, there is no contact between the lower end of the tongue 38b and the periphery of the cam head front end 23f in which the operating notch 23a is formed.

When the spindle is in the position shown in Figs. 1 and 2, the lower end of the tongue 38b rests on the entirely cylindrical periphery of the cam head rear end 23g and there is clearance between the lower face of the fence 38c and the tumbler wheels. Consequently, rotation of the knob 19 when in the position shown in Figs. 1 and 2 produces no feel whatsoever to an unauthorized person, and there is also no feel transmitted by rotation of the knob 19 after the spindle 16 has been pushed in because there is no contact between the lower end of the tongue 38b and the periphery of the cam head front end 23f.

Further for the purposes of the present invention or discovery, the hub 23b of the cam 23 has formed therein intermediate its ends an outwardly opening circular groove 23h and an outwardly opening longitudinally extending groove 23k parallel with the longitudinal axis of the spindle. The groove 23k communicates with and extends forwardly from the circular groove 23h. In the front end of the hub 23b there is formed a sectoral notch 23m, the rear end of which communicates with the front end of the groove 23k. In one side of the tube 14 there is mounted a protruding member as shown in the form of a pin 51, the inner end of which projects into the bore of the tube 14 and into the groove 23h when the spindle 16 is in its position shown in Figs. 1, 2, and 3 with the spring 50 pressing the spindle 16 forwardly.

In the improved lock 10 the spindle 16 can only be pushed inwardly when the stationary pin 51 is aligned in the groove 23h with the rear end of the groove 23k which corresponds to a certain number setting on the dial 20 with respect to the arrow 21. If an unauthorized manipulator discovers this setting and pushes the spindle 16 inwardly, the pin 51 becomes located in the sectoral notch 23m which limits the arc through which the spindle 16 may be rotated.

In authorized operation of the lock 10, the combination is first set to the position of the tumbler wheels shown in Fig. 1 with the notches 37 aligned with each other, after which the knob is then set to the position aligning the pin 51 with the groove 23k as shown in Figs. 1 and 3 when the spindle 16 may be pushed inwardly and rotated slightly to permit the tongue 38b to drop into the notch 23a. The knob 19 may then be rotated to withdraw the bolt 35 from the locking position.

A second embodiment of the improved combination lock hereof is illustrated in Figs. 8 to 12, inclusive, and indicated generally by 110; a third embodiment is illustrated in Figs. 13 to 18, inclusive, and indicated generally by 210; a fourth embodiment is illustrated in Figs. 19 to 25, inclusive, and indicated generally by 310; a fifth embodiment is illustrated in Figs. 26 to 30, inclusive, and indicated generally by 410; and a sixth embodiment is illustrated in Figs. 31 to 34, inclusive, and indicated generally by 510. The structure set forth for these embodiments generally serves the purpose of, and replaces, pin 51, grooves 23h and 23k, and notch 23m of the first embodiment, indicated generally by 10.

In each of these embodiments 110, 210, 310, 410, and 510, certain of the parts are the same as or substantially the same as similar parts of the lock 10. In the drawings, these parts which are the same or substantially the same are given the same numerals in the second to sixth embodiments, inclusive, as in the first embodiment 10, and are not described in detail in the specification. Additional or modified parts are described in detail hereinafter for each of the second to sixth embodiments of the improved combination lock.

Figure 8:
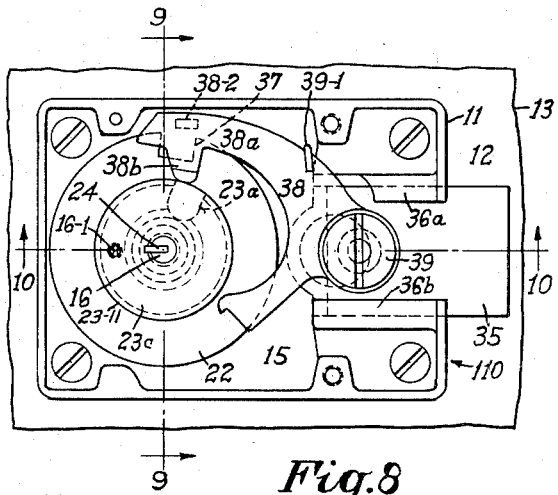
Fig. 8 is a fragmentary rear elevational view similar to Fig. 1 and showing a second embodiment of the improved combination lock hereof.
Figure 11:
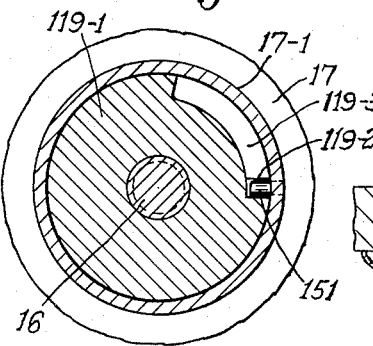
Fig. 11 is an enlarged fragmentary transverse sectional view thereof as on line 11—11, Fig. 10.
Figure 10:
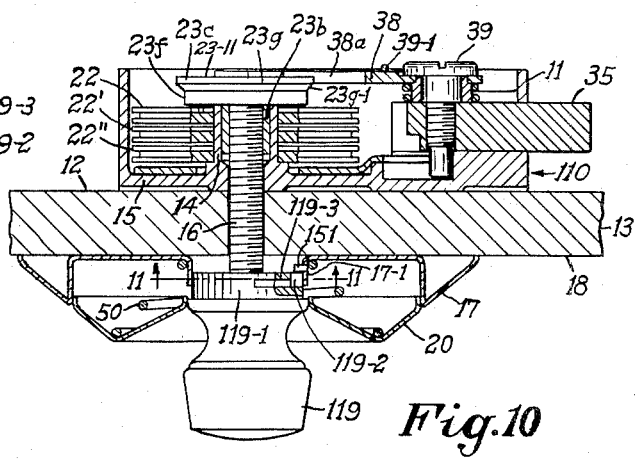
Fig. 10 is a transverse sectional view thereof as on line 10—10, Fig. 8.

The second embodiment of the improved combination lock hereof is illustrated in Figs. 8 to 12, inclusive, and indicated generally by 110, and includes in addition to parts which are the same as or substantially the same as the similar parts of the lock 10, a cam 23–11, a knob 119 which has a rear end portion 119–1 fitting in the dial ring neck 17–1. A longitudinally extending groove 119–2 parallel with the longitudinal axis of the spindle 16 is formed in the outer cylindrical periphery of the knob rear end portion 119–1 and the groove 119–2 opens through the rear end face of the knob rear end portion 119–1. The forward end of the groove 119–2 opens into a sectoral groove 119–3 formed in the outer peripheral surface of the knob rear end portion 119–1. A protruding member in the form of a pin 151 is mounted in the dial ring neck 17–1 and is located at the rear of the rear end face of the knob rear end portion 119–1 when the spindle is in its forward position as shown in Fig. 10. The knob 119 may be rotated to align the groove 119–2 with the pin 151, after the lock combination has been set as shown in Figs. 8, 10, and 11. The knob 119 may then be pushed inwardly permitting opening of the lock. Otherwise, the operation of the lock 110 is substantially the same as the lock 10.

Figure 12:
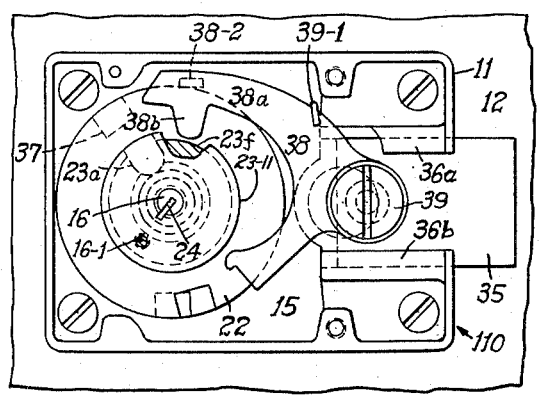
Fig. 12 is a view generally similar to Fig. 8 and showing the tumblers scrambled, the spindle pushed in, and the fence resting on top of the tumblers.
Figure 14:
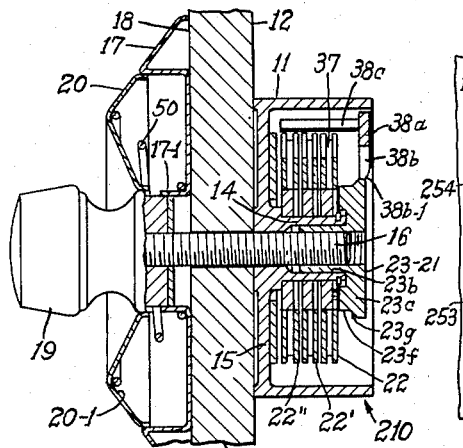
Fig. 14 is a transverse sectional view thereof as on line 14—14, Fig. 13.

Particular attention is directed to Fig. 12 showing the fence 38–2 resting on top of the tumbler wheels and with the lower end of the cam follower tongue 38b spaced above the periphery of the cam head front end portion 23f, after pushing the spindle 16 inwardly when the tumbler wheels are scrambled.

The third embodiment of the improved combination lock hereof is illustrated in Figs. 13 to 18, inclusive, and indicated generally by 210, and includes in addition to parts which are the same as or substantially the same as the similar parts of the lock 10, a cam 23–21 in which the cam head rear end portion 23g has formed therein an outwardly opening groove notch 23n and in which the cam head front end portion 23f has formed therein an outwardly opening sectoral notch 23o communicating with the groove 23n.

The lock 210 furthermore includes the stationary protruding member 251 which extends across the rear end face of the cam head 23c when the spindle 16 is in its forward position, the protruding member 251 being adapted to be aligned with the groove 23n and to permit the spindle 16 to be pushed inwardly when so aligned.

The protruding member 251 in the lock 210 is in the form of a narrow plate shank extending from a plate body 252 having an angled rear extension 253 which is secured to the case side wall 11–1 at the left of the case 11 as shown in the drawings. The angled rear extension 253 of the plate body 252 as shown is secured to the case side wall 11–1 by means of screws 254.

Figure 13:
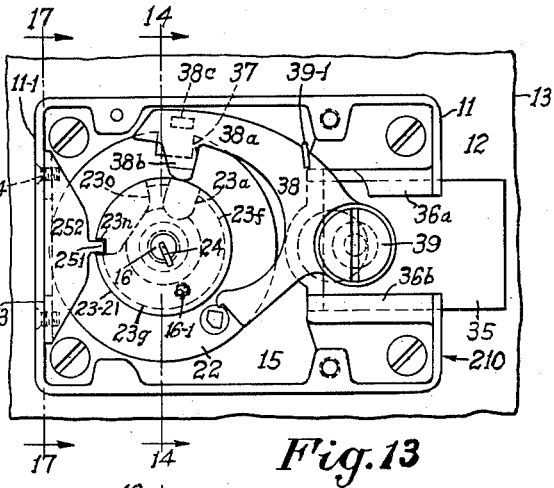
Fig. 13 is a fragmentary rear elevational view similar to Fig. 1 and showing a third embodiment of the improved combination lock hereof.
Figure 16:
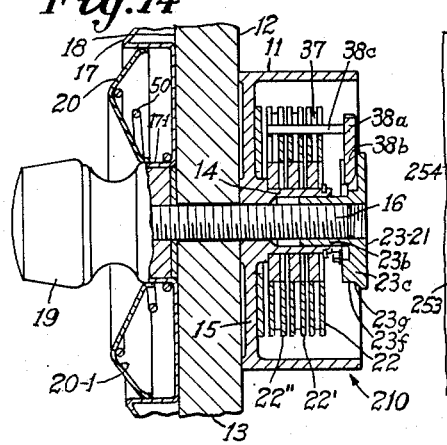
Fig. 16 is a transverse sectional view thereof as on line 16—16, Fig. 15.
Figure 15:
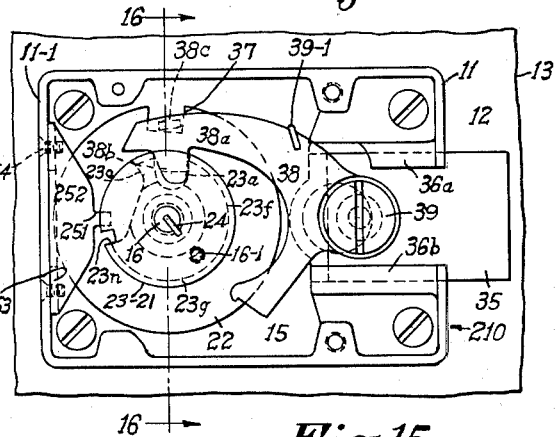
Fig. 15 is a view similar to Fig. 13 showing the spindle pushed in and the cam follower tongue dropping down into the operating notch.
Figure 18:
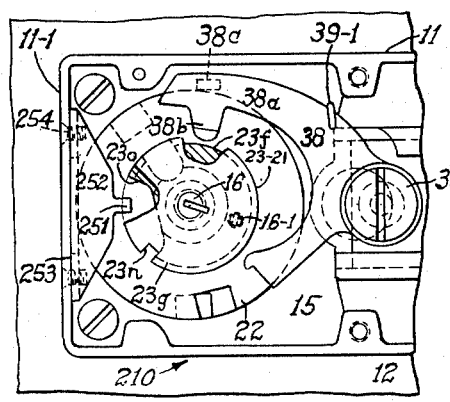
Fig. 18 is a view generally similar to Fig. 13 showing the tumblers scrambled, the spindle pushed in, and the fence resting on top of the tumblers.
Figure 17:
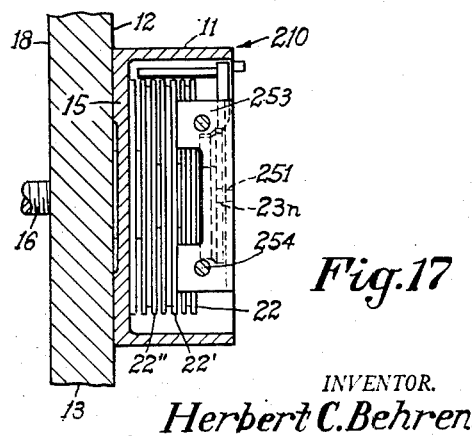
Fig. 17 is a transverse sectional view thereof as on line 17—17, Fig. 13.
Figure 32:
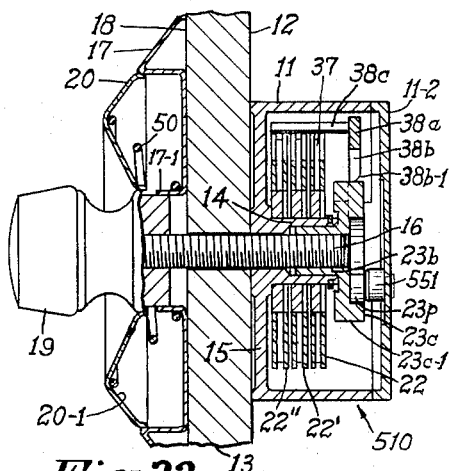
Fig. 32 is a transverse sectional view thereof as on line 32—32, Fig. 31.
Figure 31:
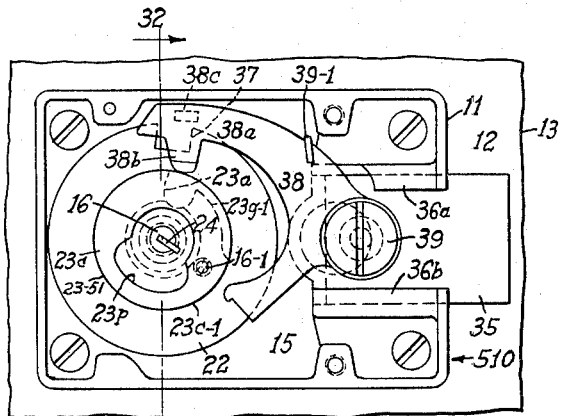
Fig. 31 is a fragmentary rear elevational view similar to Fig. 1 showing a sixth embodiment of the improved combination lock hereof.
Figure 34:
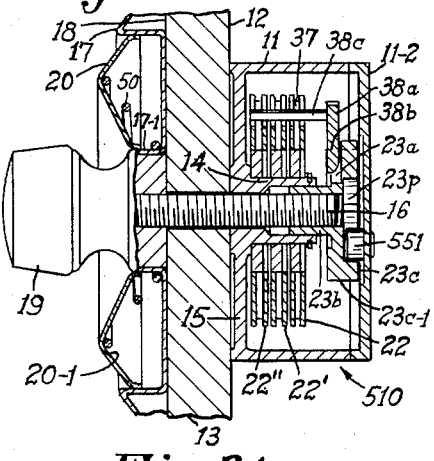
Fig. 34 is a transverse sectional view thereof as on line 34—34, Fig. 33.
Figure 33:
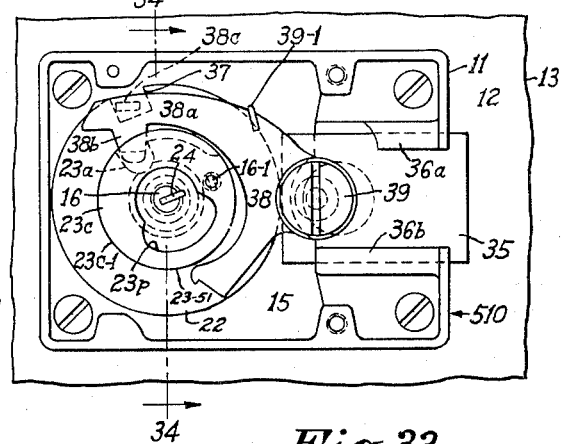
Fig. 33 is a view generally similar to Fig. 31 showing the lock parts in their relative positions with the bolt retracted.
Figure 36:
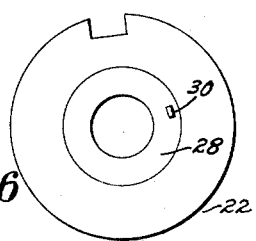
Fig. 36 is a detached elevational view of the pin face of the tumbler wheel of Fig. 35.
Figure 35:
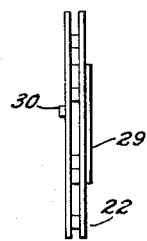
Fig. 35 is a detached side elevational view of one of the tumbler wheels used in all of the embodiments of the improved combination locks.
Figure 37:
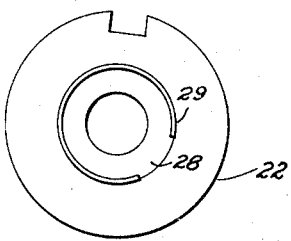
Fig. 37 is a detached elevational view of the lug face of the tumbler wheel of Figs. 35 and 36.
Figure 38:
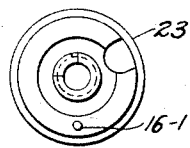
Fig. 38 is a front end elevation of the cam shown in Fig. 4 of the first embodiment of the lock.
Figure 39:
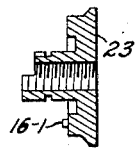
Fig. 39 is a longitudinal section through the cam shown in Fig. 38.

In the operation of the improved combination lock 210, the combination is set to the position of the parts shown in Fig. 13 after which the spindle 16 is pushed inwardly permitting slight rotation thereof to permit the cam follower tongue 38b to drop into the operating notch 23a as shown in Fig. 15. Fig. 18 shows the relative position of the lock parts when the tumbler wheels are scrambled and the spindle has been pushed in so that the lower face of the fence 38c rests on top of the tumbler wheels, and the lower end of the cam follower tongue 38b remains elevated above the outer periphery of the cam head rear portion 23g. The protruding member 251 is then located in the arcuate notch 23o which thus limits the arcuate movement possible by rotation of the spindle 16.

The fourth embodiment of the improved combination lock hereof is illustrated in Figs. 19 to 25, inclusive, and indicated generally by 310, and includes in addition to parts which are the same as or substantially the same as the similar parts of the lock 10, a cam 23–21 in which the cam head front end portion 23f is provided at its front end with an outwardly extending flange 23f–1 forming an outwardly opening groove between the flange 23f–1 and the cam head rear end portion 23g. An axial groove 23f–2 is formed in the flange 23f–1 and stop pins 23f–3 and 23f–4 extend from the front end face of the flange 23f–1.

A stationary protruding member in the form of a screw 351 is screwed in the wall 11–1 of the case 11 and has a cylindrical end shank 351–1 which extends into the groove between the flange 23f–1 and the cam head rear end portion 23g when the spindle 16 is in its forward position. When the groove 23f–2 is aligned with the shank 351–1, the spindle 16 may be pushed inwardly, and the pins 23f–3 and 23f–4 limit the arcuate movements of the spindle.

The operation of the improved combination lock 310 is substantially the same as the operation of the above described lock embodiments 10, 110, and 210.

The fifth embodiment of the improved combination lock hereof is illustrated in Figs. 26 to 30, inclusive, and indicated generally by 410, and includes in addition to parts which are the same as or are substantially the same as the similar parts of the lock 10, a cam 23–41 in which the cam head rear end portion 23g has formed therein an outwardly opening groove notch 23n and in which the cam head front end portion 23f has formed therein a cam notch 23a–1 and an outwardly opening sectoral notch 230–1 communicating with the groove 23n. The lock 410 furthermore includes a stationary protruding member in the form of a pin 451 secured to the wall 11–1 of the case 11 and extending across the rear end face of the cam head 23c when the spindle 16 is in its forward position, the protruding member 451 being adapted to be aligned with the groove 23n and to permit the spindle 16 to be pushed inwardly when so aligned. The sectoral notch 230–1 limits the arcuate movement of the spindle 16 when it is pushed inwardly.

The operation of the improved combination lock 410 is substantially the same as the operation of the above described lock embodiments 10, 110, 210, and 310.

The sixth embodiment of the improved combination lock hereof is illustrated in Figs. 31 to 34, inclusive, and indicated generally by 510, and includes in addition to parts which are the same as or are substantially the same as the similar parts of the lock 10, a cam 23–51 in which the cam head 23c has a peripheral surface 23c–1 which is substantially cylindrical excepting for the operating notch 23a formed in its front face. In the rear face of the cam head 23c there is formed an arcuate groove 23p.

The case 11 is provided with a back cover plate 11–2, and a stationary protruding member 551 is secured on the back cover plate 11–2 and extends inwardly therefrom towards the cam head 23c. When the groove 23p is aligned with the protruding member of the pin 551, the spindle 16 may be pushed inwardly.

The operation of the improved combination lock 510 is otherwise substantially the same as the operation of the above described lock embodiments 10, 110, 210, 310, and 410.

It is to be noted that in each of the improved combination locks 10, 110, 210, 310, 410, and 510, the protruding member has an end which may be aligned with clearance with the groove formed in the part attached to the spindle by rotation of the spindle to a particular dial setting. When the protruding member end is so aligned with the groove on the part attached to the spindle, the dial knob may be pushed to move the spindle longitudinally. Excepting when the groove in the spindle part is so aligned with the protruding member end, this end acts as a stop against the grooved part and prevents longitudinal movement of the spindle.

Thus, there is in effect an addition of another dial setting to the combination, and in each of the illustrated locks having three tumblers, there is required four dial settings, to set the combination and permit withdrawal of the bolt.

Also, it is to be noted that in each of the improved combination locks 10, 110, 210, 310, 410, and 510, when the spindle 16 is pushed inwardly displacing the cam from the adjacent tumbler, the drive pin 16–1 on the cam is disengaged from the adjacent tumbler. Consequently, the pushing in of the spindle is of no avail to a manipulator seeking to set the tumblers.

Further, it is to be noted that in the commercial manufacture of the above described locks 10, 110, 210, 310, and 410, each having a cam head 23c with a front end 23f in which the cam notch 23a is formed and a rear end 23g which is cylindrical around its entire periphery and which has a larger diameter than the front end 23f, there is clearance between the pivot screw 39 and the aperture in the operating lever 38 through which the pivot screw 39 extends. Also, there may be some spring in the operating arm 38a. Moreover, the force of the spring 39–1 is made only sufficient to apply a slight pressure downwardly on the operating arm 38a, whereas the force of the spring 50 urging the spindle outwardly is made sufficiently strong so as to cause the operating arm 38a to spring up when the knob 19 is released and the spindle 16 moves forwardly.

Preferably, however, to facilitate the upward movement of the operating arm 38a when the knob 19 is released, the rear face of the lower end of the tongue 38b is tapered downwardly towards the front of the lock as at 38b–1, and the enlarged rear end portion 23g of the cam head 23c is preferably formed with a front annular face 23g–1 which is frusto-conical. Accordingly, in addition to the forces above described causing the operating arm 38a to spring up when the knob 19 is released, the opposed sloping faces 38b–1 and 23g–1 produce a camming action to augment the forces operating to move the arm 38a upwardly.

Referring again particularly to the improved lock 10, as above set forth, when the spindle 16 is pushed inwardly, the pin 51 becomes located in the sectoral notch 23m, which limits the arc through which the spindle 16 may be rotated. Also, after the spindle has been pushed inwardly and rotated, the pin is displaced from alignment with the groove 23h, and the inner arcuate end face of the notch 23m acts as a stop abutting the pin 51 and holding the spindle in its pushed in position.

Thus, in the improved lock 10 the combination of the protruding member or pin 51, the longitudinal groove 23h and the sectional notch 23m performs three functions, namely: (1) Provides a fourth setting for the combination; (2) limits the arcuate movement of the spindle after the spindle has been pushed inwardly; and (3) holds the spindle in the pushed in position after the spindle has been pushed in and rotated. Each of the locks 110, 210, 310, and 410 includes parts above described which perform each of these three functions. The similar parts of the lock 510 perform the first two functions only.

It is noted moreover that the holding of the spindle after it is pushed in is also performed in each of the locks 10, 110, 210, 310, 410, and 510 by the inner face of the tongue abutting against the side face of the cam notch when the tongue is dropped into the cam notch.

In the foregoing description, certain terms have been used for brevity, clearness, and understanding, but such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. In combination lock construction, stationary parts including a base wall and a tube extending from one side of the base wall, a spindle journalled and longitudinally slidable in the tube, a plurality of tumblers journalled on the tube, parts attached to the spindle including a dial knob on the spindle on the other side of the base wall and a cam on the spindle beyond the tube and the tumblers, the spindle cam including a head and the spindle cam head having a portion adjacent the tube and tumblers formed with an outwardly opening cam notch, the remaining peripheral sector of the notched portion of the spindle cam head being cylindrical and the portion of the spindle cam head beyond the notched portion being entirely cylindrical, the tumbers each being formed with an outwardly opening notch, drive means operative between the spindle cam and the adjacent tumbler and drive means operative between each adjacent pair of tumblers, a bolt mounted on the base wall for movement to and from an extended locking position, an operating lever, a pivotal connection between the operating lever and the bolt, the operating lever including an upper arm extending above the spindle and having a cam follower tongue depending towards the spindle cam, a fence arm extending longitudinally from the operating lever upper arm above the tongue and parallel with the longitudinal axis of the spindle towards the base wall and the fence arm being located above the tumblers, the spindle cam head notch being arranged for alignment with the cam follower tongue in the direction of the longitudinal axis of the spindle when the combination is set, spring means operative to yieldingly maintain the spindle cam against the opposite end of the tube when the bolt is in the extended locking position and during setting of the combination, and the cam tongue riding on the entirely cylindrical portion of the spindle cam head when the bolt is in the extended locking position and during setting of the combination, the cam tongue being arranged to drop into the spindle cam notch when the dial knob is pushed towards the base wall after setting of the combination and after the spindle and the spindle cam are moved so that the spindle cam head notch is beneath the cam tongue, one of the parts attached to the spindle having a groove formed therein extending in the direction of the longitudinal axis of the spindle, and a protruding member mounted on and extending from one of the stationary parts adjacent the path traversed by the groove when the grooved part attached to the spindle rotates with the spindle, and the protruding member having an end engaged with the grooved part attached to the spindle and holding the spindle against longitudinal movement except when said end is aligned with the groove, and said protruding member end being alignable with clearance with the groove, whereby the knob may be pushed towards the base wall and thus move the spindle longitudinally when the protruding member end is aligned with the groove.

2. In combination lock construction as set forth in claim 1; and in which the entirely cylindrical portion of the spindle cam head has a greater diameter than the cam notched portion.

3. In combination lock construction as set forth in claim 2; and in which the fence arm has a bottom face adjacent the tumblers; and in which the tumblers each has a peripheral sector extending between the outer ends of its notch; and in which when the tumblers are scrambled so that their notches are not aligned, the fence arm bottom face rests upon the cylindrical peripheral sectors of the tumblers when the spindle is pushed to locate the knob at its innermost position adjacent the base wall; and in which the tongue has a bottom end spaced below the bottom face of the fence arm a distance such that there is clearance between the bottom end of the tongue and the peripheral sector of the notched portion of the spindle cam head when the spindle is pushed to its innermost position.

4. In combination lock construction as set forth in claim 3; and in which the groove has an entrance end for the protruding member and an exit end for the protruding member, and the grooved part has a sectoral depression formed therein and the exit end of the groove opening into the sectoral depression.

5. In combination lock construction as set forth in claim 1; and in which the groove has an entrance end for the protruding member and an exit end for the protruding member and the grooved part has a sectoral depression formed therein and the exit end of the groove opening into the sectoral depression.

6. In combination lock construction as set forth in claim 5; and in which the entirely cylindrical portion of the spindle cam head has a greater diameter than the cam notched portion.

7. In combination lock construction as set forth in claim 1; and in which the spindle cam includes a hub extending from the head towards the base wall, the hub being the grooved part and having an outwardly opening circular groove formed therein adjacent the cam head and having a sectoral notch formed therein adjacent the tube, and the longitudinally extending groove opening at one end into the circular groove and at the other end into the sectoral notch, the stationary part mounting the projecting member being the tube, and the projecting member end extending into the circular groove when the cam is in its outermost position against the tube.

8. In combination lock construction as set forth in claim 1; and in which the knob includes a rear cylindrical end portion having a rear face adjacent the base wall, the rear end portion of the knob being the grooved part and having a sectoral groove formed therein, and the longitudinally extending groove opening at one end through the rear face of the cylindrical rear end portion of the knob and at the other end into the sectoral groove; and in which the stationary parts include a dial ring between the knob and the base wall and the dial ring mounting the projecting member, and the projecting member extending crosswise of the rear face of the knob rear end portion when the cam is in its outermost position against the tube.

9. In combination lock construction as set forth in claim 1; and in which the grooved part is the entirely cylindrical portion of the cam head; and in which the stationary parts include a side wall extending from the base wall at the side of the spindle and tumblers opposite the bolt and the side wall mounting the projecting member, and the projecting member extending crosswise of the cam head when the cam is in its outermost position against the tube.

10. In combination lock construction, stationary parts including a base wall and a tube extending from one side of the base wall, a spindle journalled and longitudinally slidable in the tube, parts attached to the spindle including a dial knob on the spindle on the other side of the base wall and a cam on the spindle beyond the tube, rotatable tumblers journalled on the tube and actuated by the cam, a bolt, an operating lever engaging the bolt and engageable with the cam for actuating the bolt, one of the parts attached to the spindle having a groove formed therein extending in the direction of the longitudinal axis of the spindle, and a protruding member mounted on and extending from one of the stationary parts adjacent the path traversed by the groove when the grooved part attached to the spindle rotates with the spindle and the protruding member having an end engaged with the grooved part attached to the spindle and holding the spindle against longitudinal movement except when said end is aligned with the groove, and said protruding member end being alignable with clearance with the groove, whereby the knob may be pushed towards the base wall and thus move the spindle longitudinally when the protruding member end is aligned with the groove to permit the operating lever to be actuated by the spindle through the cam.

11. In combination lock construction as set forth in claim 10; and in which the groove has an entrance end for the protruding member and an exit end for the protruding member, and the grooved part has a sectoral depression formed therein and the exit end of the groove opening into the sectoral depression.

12. In combination lock construction as set forth in claim 10; and in which the spindle cam includes a head and a hub extending from the head towards the base wall, the hub being the grooved part and having an outwardly opening circular groove formed therein adjacent the cam head and having a sectoral notch formed therein adjacent the tube, and the longitudinally extending groove opening at one end into the circular groove and at the other end into the sectoral notch, the stationary part mounting the projecting member being the tube, and the projecting member end extending into the circular groove when the cam is in its position nearest the tube.

13. In combination lock construction as set forth in claim 10; and in which the knob includes a rear cylindrical end portion having a rear face adjacent the base wall, the rear end portion of the knob being the grooved part and having a sectoral groove formed therein, and the longitudinally extending groove opening at one end through the rear face of the cylindrical rear end portion of the knob and at the other end into the sectoral groove; and in which the stationary parts include a dial ring between the knob and the base wall and the dial ring mounting the projecting member, and the projecting member extending crosswise of the rear end face of the knob rear end portion when the cam is in its outermost position against the tube.

14. In combination lock construction as set forth in claim 10; and in which the grooved part is the cam; and in which the stationary parts include a side wall extending from the base wall at one side of the spindle, and the projecting member extending crosswise of the cam when the cam is in its position nearest the tube.

15. In combination lock construction, a part adapted for attachment to a combination lock spindle, the part having a groove formed therein extending in a direction parallel with the longitudinal axis of the spindle when the part is attached to the spindle, and the groove having an entrance end for a protruding member and an exit end for the protruding member, and the part having a sectoral depression formed therein and the exit end of the groove opening into the sectoral depression.

16. In combination lock construction, a rotatable and axially movable spindle, a plurality of rotatable tumblers provided with outwardly opening notches adapted to be aligned when the combination is set, drive means engageable between the spindle and tumblers when the spindle is in one position of axial movement for rotating the tumblers to set the combination upon selective rotation of the spindle, said drive means being disengaged when the spindle is in another position of axial movement, a bolt, an operating lever pivotally mounted on the bolt, a fence on the operating lever adapted to be received in said aligned tumbler notches upon movement of the operating lever toward the spindle when the combination is set, interengageable means on the operating lever and spindle holding the lever in a raised position with respect to the spindle and holding the fence out of contact with the tumblers when the spindle is in said one position, said interengageable holding means being disengaged when the drive means is disengaged upon actuation of the spindle axially to said other position, and interengageable notch and tongue means on the spindle and lever for actuating the lever to operate the bolt by rotation of the spindle when the spindle is in said other axial position, a control member, and the spindle being formed with co-acting axially extending and sectoral groove means engageable with the control member, the axially extending groove means receiving the control member and permitting axial movement of the spindle from said one position only at one rotated position of the spindle, and the sectoral groove means and control member limiting rotative movement of the spindle when axially moved to said other axial position.

17. The construction set forth in claim 16 in which there is stop means engaged with the spindle holding the spindle in said other axial position when the spindle is rotated and the lever actuated to operate the bolt.

18. The construction set forth in claim 16 in which there are interengaging stop means on the lever and spindle holding the spindle in said other axial position when the spindle is rotated and the lever actuated to operate the bolt.

19. The construction set forth in claim 16 in which there are interengaging stop means on the lever and spindle holding the spindle in said other axial position when the spindle is rotated and the lever actuated to operate the bolt, and in which the stop means comprise a cam notch wall on the spindle and a tongue portion projecting from the lever below the fence.

20. The construction set forth in claim 19 in which the cam notch wall and the tongue portion have oppositely sloping faces abutting each other when in interengagement.

21. The construction set forth in claim 16 in which the interengageable holding means comprise a cylindrical cam surface on the spindle and a tongue portion projecting from the lever below the fence.

22. The construction set forth in claim 16 in which the interengageable notch and tongue means comprise a cam notch provided on the spindle and a tongue portion projecting from the lever below the fence.

23. The construction set forth in claim 16 in which a cam member is mounted on the spindle having a cylindrical surface and provided with a notch adjacent said surface, in which a tongue projects from the lever toward the cam member, in which a portion of the tongue and a surface of said cam notch provide interengaging stop means holding the spindle in said other axial position when the spindle is rotated and the lever actuated to operate the bolt, in which another portion of the tongue and said cylindrical cam surface comprise the interengageable holding means, and in which other portions of said tongue and other surfaces of said cam notch provide interengageable means for actuating the lever to operate the bolt by rotation of the spindle.

References Cited in the file of this patent

UNITED STATES PATENTS

| | | |
|---|---|---|
| 116,737 | Miller | July 4, 1871 |
| 237,950 | Bernhardt | Feb. 22, 1881 |
| 821,548 | Streeter et al. | May 22, 1906 |
| 1,191,638 | Whitmarsh | July 18, 1916 |
| 2,575,674 | Miller | Nov. 20, 1951 |